US006744984B1

(12) United States Patent
Faruque et al.

(10) Patent No.: US 6,744,984 B1
(45) Date of Patent: Jun. 1, 2004

(54) METHOD AND SYSTEM FOR ALTERNATIVE TRANSMISSION TRAFFIC ROUTING IN DENSE WAVELENGTH DIVISION MULTIPLEXING OPTICAL NETWORKS

(75) Inventors: Saleh Faruque, Plano, TX (US); Fereidoun Homayoun, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/577,454

(22) Filed: May 24, 2000

(51) Int. Cl.[7] .............................. H04J 14/00; H04J 4/00

(52) U.S. Cl. .............................. 398/57; 398/68; 398/77

(58) Field of Search .............................. 359/124, 125, 359/128, 118, 119; 398/51, 57, 58, 59, 68, 77

(56) References Cited

U.S. PATENT DOCUMENTS 5,253,248 A * 10/1993 Dravida et al. ............. 370/228
5,901,138 A * 5/1999 Bader et al. ............... 370/229
5,940,379 A * 8/1999 Startup et al. .............. 370/320
6,160,651 A * 12/2000 Chang et al. ................. 398/79
6,215,765 B1 * 4/2001 McAllister et al. ......... 370/217
6,504,832 B1 * 1/2003 Koo et al. .................. 370/342

OTHER PUBLICATIONS

Alcatel Optical Networks Technical Papers, *DWDM Channel Spacing Do You know How Much Capacity You're Really Getting*, Paper No. AD98–04, pp. 1–8.

* cited by examiner

*Primary Examiner*—Leslie Pascal
*Assistant Examiner*—Dzung Tran
(74) *Attorney, Agent, or Firm*—Haynes & Boone, LLP

(57) ABSTRACT

A system and method is disclosed for providing high-speed, high capacity data communication over a Wave Division Multiplexing (WDM) network with an efficient re-routing capability. When all light channels between two nodes in the network are loaded with transmission jobs, a transmission traffic congestion is created. In order to avoid or alleviate the congestion, a new alternative route is needed. An alternative route is selected to direct the traffic away from the congested route, and further expand the channel capacity of the alternative route by encoding the light channels in the alternative route with orthogonal codes.

7 Claims, 2 Drawing Sheets

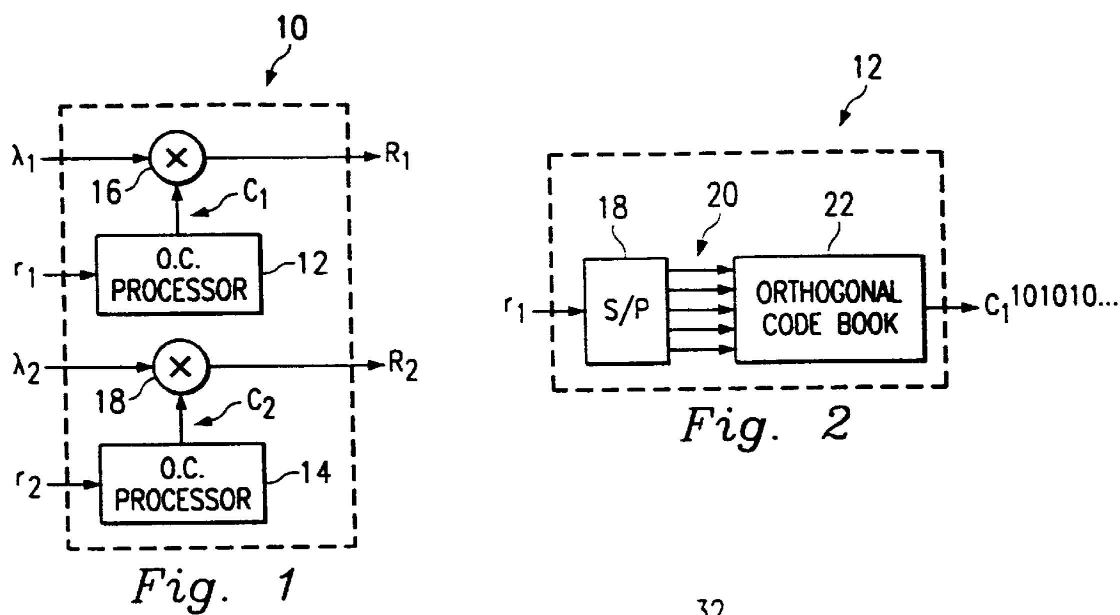
Fig. 1
Fig. 2
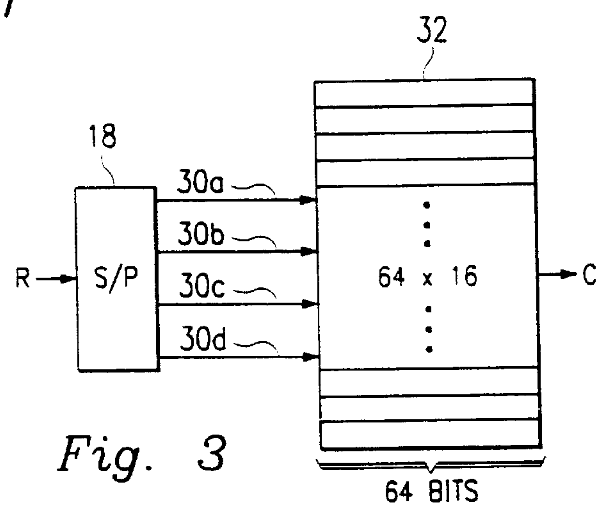
Fig. 3

Node B
Path-2
Path-3
$\lambda_1$
$\lambda_2$
Node A
Node C
Path-1 (busy)
48
42
44
46

Node B
Path-2
Path-3
$\lambda_1$, $C_q$
$\lambda_1$, $C_k$
Node A
Node C
Path-1 (busy)
48
44
46

METHOD AND SYSTEM FOR ALTERNATIVE TRANSMISSION TRAFFIC ROUTING IN DENSE WAVELENGTH DIVISION MULTIPLEXING OPTICAL NETWORKS

CROSS REFERENCE

This application relates to U.S. application Ser. No. 09/455,090, which was filed on Dec. 6, 1999, and U.S. application Ser. No. 09/522,161, which was filed on Mar. 9, 2000, both of which are herein incorporated by reference.

BACKGROUND OF THE INVENTION

The present invention relates generally to telecommunication networks, and more particularly, to a system and method for providing a channel capacity expansion mechanism for high-speed data transmission over an optical network.

Optical networks are high-capacity telecommunications networks based on optical technologies and components that provide routing, grooming, and restoration at the wavelength level. They provide higher capacity communication networks for new applications such as the Internet, video and multimedia interaction, and advanced digital services at a reduced cost. Wavelength Division Multiplexing (WDM) technology is widely used in optical networks to provide additional capacity on existing fibers. Using the WDM technology, the components of the optical network are defined according to how the wavelengths are transmitted, groomed, or implemented in the network.

WDM technology combines many signals, or "virtual" fibers, onto a single physical fiber by transmitting each signal at a different frequency. Furthermore, with the improvement of optical filters and other laser technology, the number of effective channels on a single physical fiber for carrying the signals is continually increasing. Currently, dense wavelength division multiplexing (DWDM) technology allows a single fiber to provide 40 or 80 channels for carrying signals. Consequently, by implementing DWDM systems and optical amplifiers, networks can now provide a variety of channels with different bit rates, e.g., OC-48 or OC-192, over a single fiber.

One major problem in designing a DWDM system is creating a channel spacing plan. Although the, International Telecommunication Union (ITU) has published a standard set of frequencies based on different channel spacing, the 50 GHz and 100 GHz plans are still the most commonly used. Furthermore, as these systems are rapidly deployed, it is likely that both OC-48 and OC-192 channels will be carried. However, at a low channel spacing plan such as 50 GHz, OC-192 channels can not be adjacent because an interference will ensue (referred to as "neighboring channel interference"). Moreover, this interference problem cannot be prevented by filtering mechanisms. Due to this neighboring channel interference, the available number of OC-192 channels for a channel spacing plan of 50 GHz is almost cut in half.

Another common problem in DWDM communication networks is the transmission traffic congestion problem due to unexpected heavy loads on a particular transmission route. In such situations, one or more alternative routes are needed to bypass the congested route. It is thus desirable that channel capacities on the alternative routes can be expanded to the maximum for effectively and smoothly completing the transmissions.

It is further desired to provide a mechanism to further increase the channel capacity of multiple transmission routes of a WDM system with minimum neighboring channel interference.

SUMMARY OF THE INVENTION

In response to these and other problems, an improved system and method is disclosed for providing high-speed, high capacity data communication over a Wave Division Multiplexing (WDM) network with an efficient re-routing capability.

When all light channels between two nodes in the network are loaded with transmission jobs, a transmission traffic jam, or congestion, is created. In order to avoid the congested route, a new alternative route is need to alleviate the heavily load. One example of the present invention selects an alternative route to direct the traffic away from the congested route, and further expand the channel capacity of the alternative route by modulating or encoding the light channels in the alternative route with orthogonal codes.

In order to select the alternative route, at least one intermediate routing point must be identified. Assuming the congested route has a starting point and a destination point, the intermediate routing point is determined based on communication channel availability between the starting node and the intermediate routing point, and further between the intermediate routing point and the destination point. Encoding one or more light channels between the starting node and the intermediate routing point with a set of orthogonal codes will significantly expand the communication channel availability. The same can be achieved by encoding one or more light channels between the intermediate routing point and the destination point. These encoding processes help to improve system manageability and route flexibility.

In another example of the present invention, the light channels on the alternative route do not have to be encoded until needed. That is, the system has a choice of using existing light channels without orthogonally encoding them if there are enough channels for directing the transmission traffic away from the congested route.

BRIEF DESCRIPTION OF THE DRAWINGS

FIG. 1 is a schematic for a simplified Wave Division Multiplexing (WDM) communication system having multiple orthogonal code processors.

FIG. 2 is a schematic of one of the orthogonal code processors of the communication system of FIG. 1.

FIG. 3 is a detailed schematic diagram for one example of the orthogonal code processor described in FIG. 2.

DESCRIPTION OF THE PREFERRED EMBODIMENT

Figure 4:
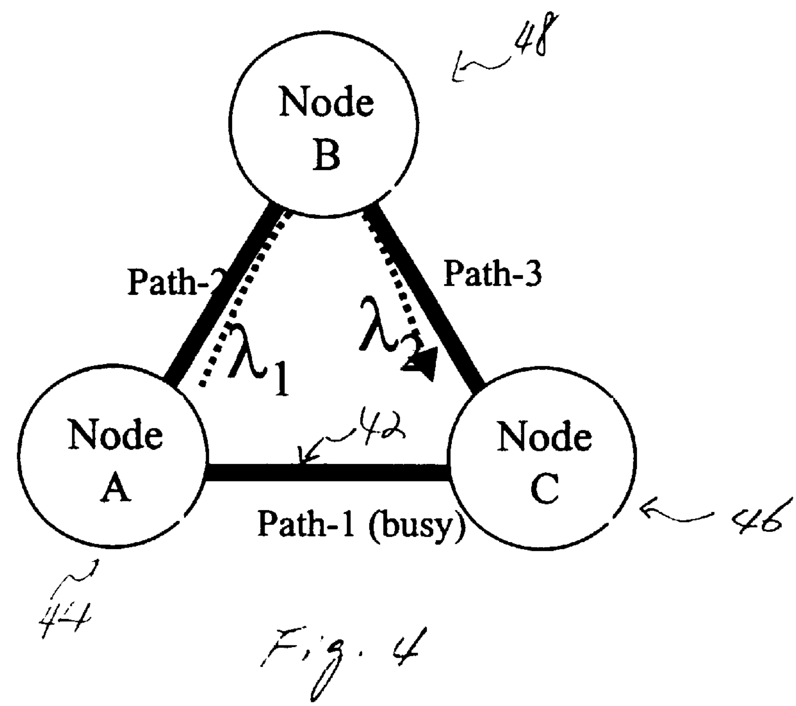
FIG. 4 illustrates a simplified routing arrangement for a WDM communication network.

Referring now to FIG. 1, the reference numeral 10 designates a simplified WDM communication system. The system 10 employs narrowly spaced communication channels such as OC-192 channels. Two communication channels, $\lambda_1$ and $\lambda_2$, represents two neighboring light channels. A first user data stream $r_1$ is to be carried on the light channel $\lambda_1$, and a second user data stream $r_2$ on the light channel $\lambda_2$. The user data streams $r_1$ and $r_2$ are first processed by orthogonal code processors 12 and 14, respectively. The light channels $\lambda_1$ and $\lambda_2$ are further modulated by modulators 16 and 18, respectively, using orthogonal codes generated from the orthogonal code processors 12 and 14.

Since each light channel is in fact a beam of light at a certain frequency, the channel is modulated by controlling the ON/OFF pattern of the light according to an orthogonal code C1 or C2 generated by the orthogonal code processor 12 or 14. Consequently, the light channel can be modulated to be an exact representation of the generated orthogonal code by appropriately controlling its ON/OFF pattern. Since a predetermined code plan can assure that the orthogonal code selected by the orthogonal code processor 12 is different from that of the orthogonal code processor 14, two distinctive output data streams $r_1$ and $r_2$, i.e., two modulated light channels, can thus successfully transmit data without having neighboring channel interferences.

Referring now to FIG. 2, the orthogonal code processor 12 is similar in configuration to the processor 14 and will be discussed in greater detail below, with differences between the two processors discussed where necessary. When the incoming user data stream $r_1$ is provided to the orthogonal code processor 12, it is first split into a plurality of sub streams of data 20 by a splitter 18. The sub streams of data 20 are then provided to an orthogonal code book 22. The orthogonal code book 22 selects, or "maps," a unique orthogonal code of n-bits in length as an output C1. Similarly, the orthogonal code processor 14 provides an output C2 (FIG. 1).

One method of selecting an orthogonal code from an orthogonal code book using incoming data is described in the U.S. Pat. application Ser. No. 09/455,090, filed on Dec. 6, 1999 and herein incorporated by reference. It is understood that the splitter 18 can split the incoming user data stream $r_1$ into different numbers of sub streams depending on a predetermined code selection plan such as the selection of a Read Only Memory of a specific size, the length of the orthogonal code, etc. It is also understood that the orthogonal code processors 12 and 14 can be structurally identical except that each contains a different orthogonal code book according to the predetermined code plan so that the codes generated by one of the processors (C1 or C2) will not interfere with those from the other.

Referring back to FIG. 1, by selecting an appropriately predetermined code plan, the orthogonal codes generated by the orthogonal code processors 12 and. 14 can always be maintained. "orthogonal" to each other. Hence, using these two non-interfering codes to modulate the neighboring light channels $\lambda_1$ and $\lambda_2$, information transferred through these channels does not encroach on one another, even if the two channels become partially overlapped because of insufficient spacing. It is further understood that a receiving instrument can easily decode the orthogonal code carried in the light channel if the code plan is known to the receiving instrument.

Turning now to FIG. 3, in one example of the orthogonal code processor described in FIG. 2, an incoming data stream "R" is split into 4 parallel sub streams 30*a*, 30*b*, 30*c*, and 30*d* by the splitter 18. Once the splitter 18 divides the incoming data stream. "R" into these sub streams, the sub streams are grouped and fed into a Read Only Memory (ROM) 32. Since the input to the ROM 32 is four (4) bits long as decided by an predetermined code plan, the ROM 32 has to be an n×16 matrix, where every four input bits select a unique output code "C" of a predetermined length of n bits. In this example, the length of each code or each row in the ROM is set at 64 bits. Therefore, in this embodiment, the ROM 32 is a 64×16 ROM. It is understood that the predetermined code plan can decide the length of the orthogonal code, the number of sub streams split from the incoming data stream, etc., with the consideration of various performance characteristics such as data transmission speed, error correction capability, etc.

Referring further to FIG. 4, a WDM communication network 40 is now simplified as having three Nodes A, B, and C. First, it is assumed that a predetermined group of light channels 42 in this WDM network are used between Node A 44 and Node C 46. In a situation when the channels between Nodes A and C are all occupied, a traffic jam is created and no more information can be transmitted therebetween. In dealing with this kind of unexpected channel saturation problem, an alternative routing mechanism may be put in place. In a simplified case, information sent from Node A 44 and destined for Node C 46 is first transmitted to Node B 48, and is further sent to Node C 46 to complete the transmission journey. However, the selection of an alternative route largely depends on the availability of transmission channels. That is, only when communication channels are available between Node A 44 and Node B 48, and further between Node B 48 and Node C 46, it is possible to select Node B 48 as an intermediate routing point.

Figure 5:
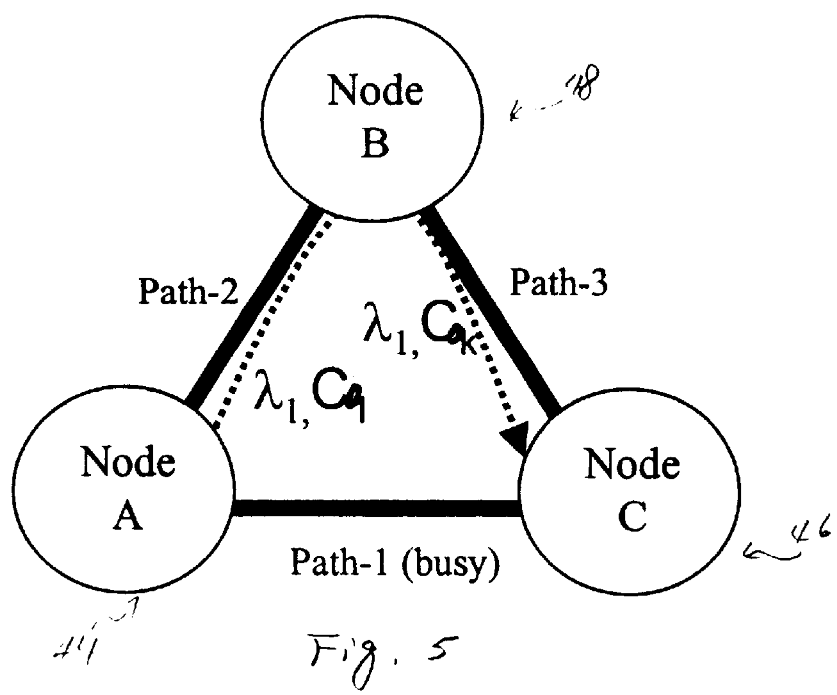
FIG. 5 illustrates an improved routing arrangement for a WDM communication network according to one example of the present invention.

Referring now to FIG. 5, one example of the present invention expands the channel capacity on an alternative route by modulating its light channels with orthogonal codes For instance, the channel capacity between Node A 44 and Node B 48 is significantly expanded when the available light channels between them are encoded with orthogonal codes. Similarly, the channel capacity between Node B 48 and Node C 46 can also be expanded in the same fashion, if needed. The channel capacity expansion is significant with the encoding method. For example, if there are forty light channels available between Node A 44 and Node B 48, and a set of sixty-four orthogonal codes are used, a total of 2,560 (64×40) communication channels will now be available. When a transmission traffic jam occurs between Node A 44 and Node C 46, Node B 48 is more likely to be selected as the intermediate routing point due to the availability of many free communication channels. As shown in FIG. 5, if light channel $\lambda_1$ is used between Node A 44 and Node B 48 with an orthogonal code $Co_1$ as the encoding code, the same light channel $\lambda_1$ can still be used between Node B 48 and Node C 46 with a different code $Co_K$.

In another example of the present invention, the channels between Node A 44 and Node B 48 do not have to be encoded until needed. That is, after an intermediate routing point is identified, the system has the choice of using the light channels without orthogonally encoding if there are enough channels for directing the traffic away from the jammed route, e.g., from Node A 44 to Node C 46.

In addition, there is no detrimental effect of the neighboring channel interference between any two communication channels due to the encoding process. Each available channel is thus interference proof because each code used is inherently "orthogonal" to others.

The above disclosure provides many different embodiments, or examples, for implementing different features of the invention. Specific examples of components, and processes are described to help clarify the invention. These are, of course, merely examples and are not intended to limit the invention from that described in the claims.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for increasing channel capacity in a wavelength division multiplexing optical network for directing transmission traffic away from a congested route, the congested route having a starting node and a destination node, the method comprising the steps of:

selecting at least one intermediate routing point to use in constructing an alternative route based on communication channel availability between the starting node and the intermediate routing point, and further between the intermediate routing point and the destination node, wherein the selecting occurs in response to identifying the congestion of the congested route;

encoding one or more light channels between the starting node and the intermediate routing point with a first set of orthogonal codes; and encoding one or more light channels between the intermediate routing point and the destination node with a second set of orthogonal codes, wherein the alternative route has an expanded communication channel capacity due to the encoding processes.

2. The method of claim 1 wherein the step of selecting further includes:

determining whether the light channels between the starting node and the intermediate routing point need to be encoded with orthogonal codes; and determining whether the light channels between the intermediate routing point and the destination node need to be encoded with orthogonal codes.

3. The method of claim 1 wherein the first and second set of orthogonal codes contains identical orthogonal codes.

4. A system for increasing channel capacity in a wavelength division multiplexing optical network for directing transmission traffic away from a congested route, the congested route having a starting node and a destination node, the system comprising:

means for selecting at least one intermediate routing point to use in constructing an alternative route based on communication channel availability between the starting node and the intermediate routing point, and further between the intermediate routing point and the destination node, wherein the selecting occurs in response to identifying the congestion of the congested route;

means for encoding one or more light channels between the starting node and the intermediate routing point with a first set of orthogonal codes; and means for encoding one or more light channels between the intermediate routing point and the destination node with a second set of orthogonal codes, wherein the alternative route has an expanded communication channel capacity due to the encoding processes.

5. The system of claim 4 wherein the means for selecting further includes:

means for determining whether the light channels between the starting node and the intermediate routing point need to be encoded with orthogonal codes; and means for determining whether the light channels between the intermediate routing point and the destination node need to be encoded with orthogonal codes.

6. A method for increasing channel capacity in a wavelength division multiplexing optical network for directing transmission traffic away from a congested route, the method comprising:

identifying the congested route, wherein the congested route has a starting node and a destination node;

responsive to the identification of the congested route, dynamically constructing an alternative route through an intermediate routing point based on communication channel availability between the starting node and the intermediate routing point, and between the intermediate routing point and the destination node; and encoding one or more light channels between the starting node and the intermediate routing point with a first set of orthogonal codes, and encoding one or more light channels between the intermediate routing point and the destination node with a second set of orthogonal codes.

7. A method for increasing channel capacity in a wavelength division multiplexing optical network for directing an information transmission away from a congested route, the congested route having a starting node and a destination node, the method comprising:

identifying an occurrence of congestion in the congested route;

dynamically constructing an alternative route in response to identifying the occurrence of congestion, wherein the alternative route is based on communication channel availability between the starting node and the intermediate routing point, and between the intermediate routing point and the destination node;

encoding one or more light channels between the starting node and the intermediate routing point with a first set of orthogonal codes for conveying the entire information transmission; and encoding one or more light channels between the intermediate routing point and the destination node with a second set of orthogonal codes for conveying the entire information transmission, wherein the alternative route has an expanded communication channel capacity due to the encoding processes.

* * * * *